United States Patent [19]

Drummond

[11] 4,277,954

[45] Jul. 14, 1981

[54] FOOD PRODUCT CHILLER

[76] Inventor: Russell F. Drummond, 532 Embry La., Marietta, Ga. 30066

[21] Appl. No.: 90,333

[22] Filed: Nov. 1, 1979

[51] Int. Cl.³ .............................................. F25D 17/02
[52] U.S. Cl. ...................................... 62/375; 198/952
[58] Field of Search ................... 62/63, 266, 374, 375, 62/380, 381; 198/952

[56] References Cited

U.S. PATENT DOCUMENTS

| | | | |
|---|---|---|---|
| 925,605 | 6/1909 | Solliday | 62/375 |
| 1,550,946 | 8/1925 | Braungart, Jr. et al. | 62/375 |
| 1,898,758 | 2/1933 | Bottoms | 62/375 |
| 3,173,276 | 3/1965 | Martin | 62/380 |
| 3,315,489 | 4/1967 | Zebarth et al. | 62/374 |
| 3,405,531 | 10/1968 | Davis, Jr. et al. | 62/374 |
| 3,844,135 | 10/1974 | Zamiara | 62/375 |
| 4,138,860 | 2/1979 | Drummond | 62/375 |

Primary Examiner—Ronald C. Capossela
Attorney, Agent, or Firm—B. J. Powell

[57] ABSTRACT

A chiller for edible food products including an insulated enclosure, an endless conveyor conveying the edible food products along a serpentine path through the enclosure along a plurality of vertically extending flights alternating between upward and downward movement and a horizontally extending flight above the vertical flights, means for evenly distributing a heat transfer liquid uniformly over the horizontally extending flight so that the heat transfer liquid falls over the food products moving along the horizontal flight, and deflection means below the horizontal flight between the vertical flights for deflecting the heat transfer liquid into registration with the vertically moving flights.

10 Claims, 9 Drawing Figures

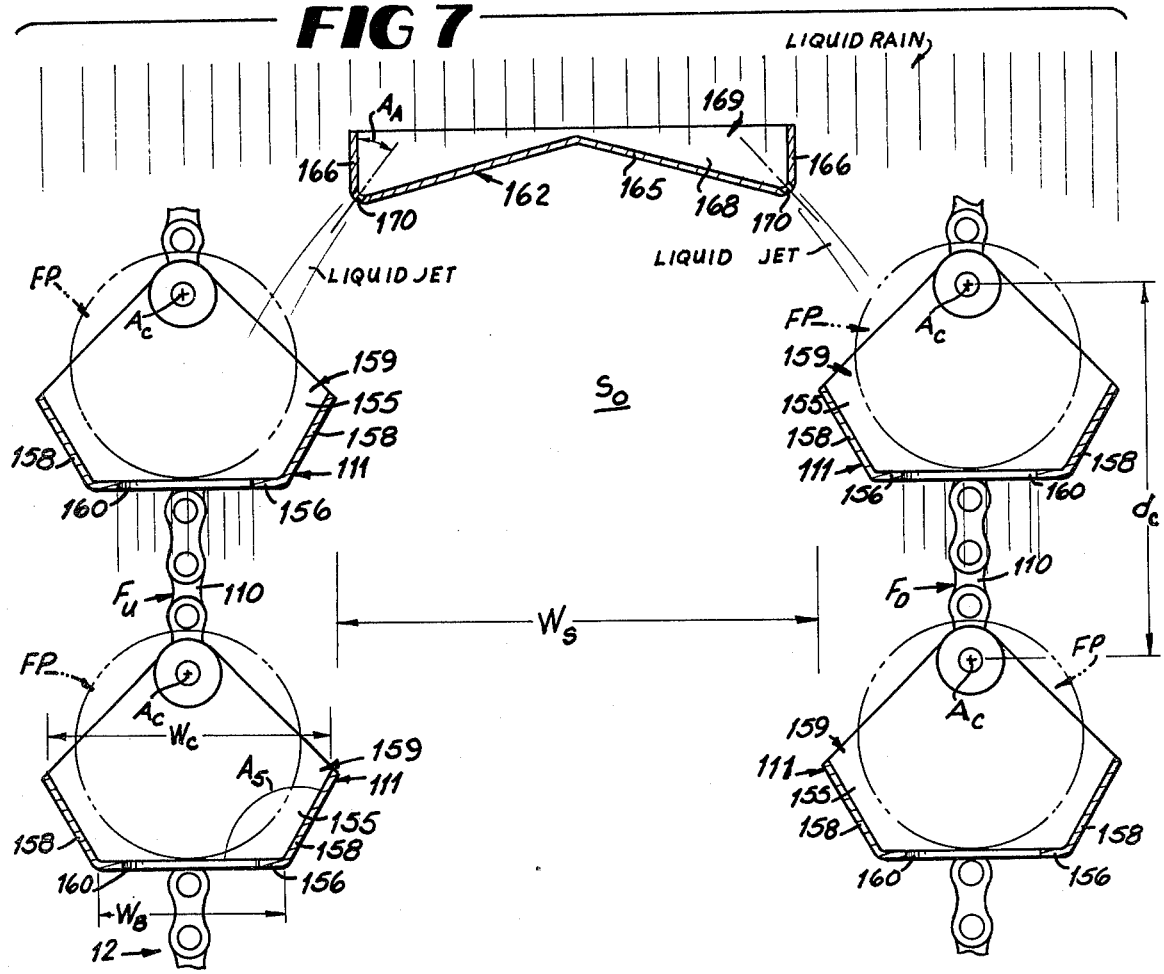
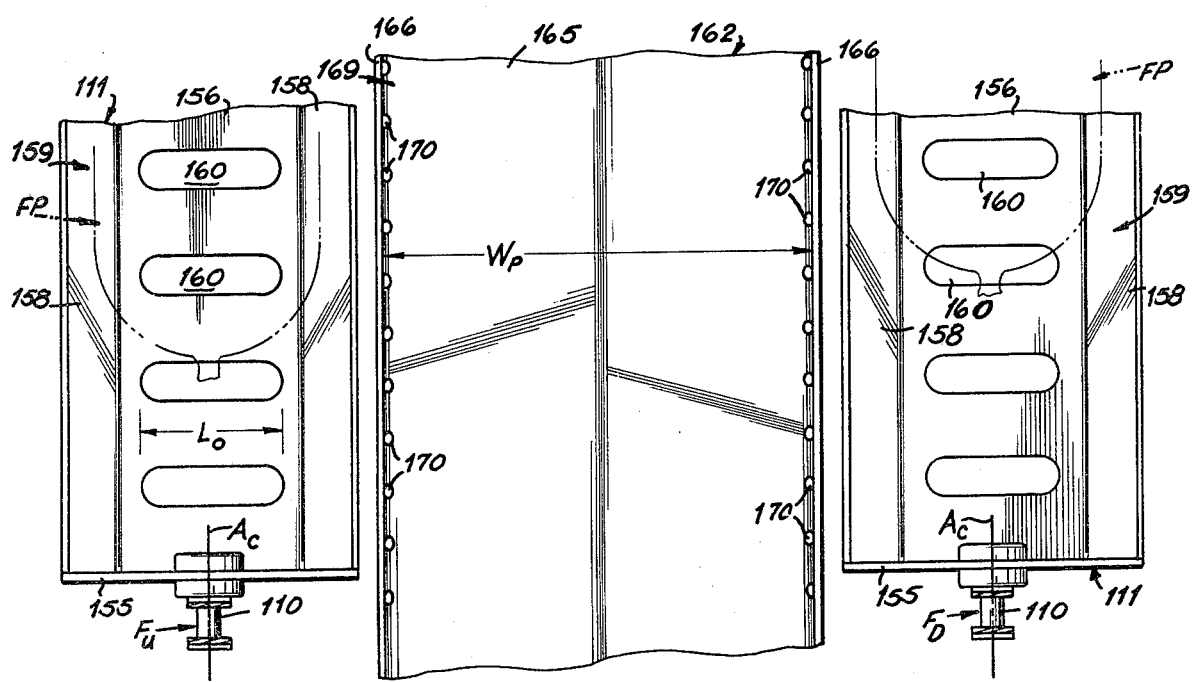

FOOD PRODUCT CHILLER

BACKGROUND OF THE INVENTION

This invention relates generally to refrigeration equipment and more particularly to chillers for edible food products using cooled liquids to lower the temperature of the food products.

After the processing of edible food products, it is usually necessary to lower the temperature thereof for the purpose of preservation of the product during shipping and storage. This chilling operation is usually required to be performed quickly to prevent spoilage of the products, especially where the processed food product is in an uncooked or partially cooked state, and must also be carried out efficiently, to keep the ultimate cost of the food products economical. Such chilling operations are commonly associated with the poultry processing industry and with the red meat industry, especially sausage products.

This chilling operation is typically carried out by chillers which bring the edible food products into a heat exchange relationship with a cooled heat transfer liquid. These chillers generally have an enclosure through which the food products are moved by a conveyor along a serpentine path. The cooled heat transfer liquid is usually sprayed or otherwise distributed over the top of the enclosure and falls to the bottom of the enclosure by gravity so that the heat transfer liquid comes into a heat transfer relationship with the food products on the conveyor as it falls. The heat transfer liquid is collected at the bottom of the enclosure for recirculation back to the top of the enclosure and is maintained in a cooled condition by appropriate refrigeration equipment. Where such heat transfer fluid comes into direct contact with the edible food product, non-contaminating liquids such as brine solutions are typically used. Where the food products have been packaged in liquid proof packages, other liquids such as propylene glycol are typically used.

One such prior art chiller is illustrated in my earlier U.S. Pat. No. 4,138,860, issued Feb. 13, 1979. This patent has a conveyor which moves the food products along a serpentine path through the enclosure along generally parallel flights at an acute angle to the vertical so that the liquid refrigerant falls onto several of the food products moving along these flights before it reaches the bottom of the enclosure. Another prior art chiller is illustrated in U.S. Pat. No. 3,173,276, issued Mar. 16, 1965, which uses air rather than a liquid as the heat transfer medium. The conveyor in this patent moves along a serpentine path with parallel horizontal flights. Another prior art chiller is illustrated in U.S. Pat. No. 3,315,489, issued Apr. 25, 1967, which uses a plurality of vertically spaced horizontally extending belts to carry the food products and over which the liquid refrigerant is distributed.

These prior art chillers have not been able to maximize the residence time of the food products within the enclosure so as to minimize the amount of floor space required for the chiller while at the same time maximizing the number of food products contacted as the heat transfer liquid falls from the top to the bottom of the enclosure so as to maximize the heat transfer rate out of the food products. As a result, these prior art chillers have not been able to minimize the acquisition and operating costs thereof.

SUMMARY OF THE INVENTION

These and other problems and disadvantages associated with the prior art are overcome by the invention disclosed herein by maximizing the amount of contact between the food products and the heat transfer liquid falling through the enclosure of the invention so as to maximize the overall rate of heat transfer from the food products to the transfer liquid. Further, the serpentine path along which the food products are moved in the invention is arranged so as to minimize the amount of floor space required with the invention. This serves to minimize both the acquisition and operating costs of the invention.

The invention moves the food products along a serpentine path through an enclosure along a plurality of spaced apart, substantially vertically extending flights so that the food products are alternately moved vertically upwardly and downwardly within the enclosure. Liquid control means is provided for supplying the heat transfer liquid to the upper portion of the enclosure so that the heat transfer liquid falls toward the bottom of the enclosure under the influence of gravity and maintains the flow of the heat transfer liquid in flow paths in registration with the food products as they move along the substantially vertical flights so that substantially all the heat transfer liquid flows down over the food products moving along the vertical flights. The invention also moves the food products along a horizontal flight positioned above the vertical flights, evenly distributes the flow of the heat transfer liquid over the horizontally moving flight and then divides the flow of the heat transfer liquid into the separate flow paths in registration with the vertically moving flights.

The apparatus of the invention includes an enclosure in which is mounted an endless conveyor with a plurality of spaced apart, substantially vertically extending flights within the enclosure so that the flights alternately move up and down within the enclosure. The conveyor also has a horizontal flight positioned above the vertically extending flights. The food products are supported in carriers on the conveyor and sequentially moved along these flights of the conveyor through the enclosure. A liquid distribution pan is provided above the horizontally moving flight for evenly distributing the heat transfer liquid over the top of the enclosure so that the heat transfer liquid falls by gravity onto the food products in the carriers moving along the horizontal flight. A plurality of deflection pans are provided below the horizontal flights between the upper ends of the vertically extending flights for deflecting the heat transfer liquid falling between the vertically extending flights into registration with the vertically extending flights so that substantially all the heat transfer liquid flows sequentially over the food products in the vertically extending flights. Means is also provided for insulating the enclosure to reduce the heat loss therefrom.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 7 is an enlarged fragmentary cross-sectional view illustrating the liquid flow control in the invention;

FIG. 8 is a top plan view of the structure seen in FIG. 7; and

Figure 1:
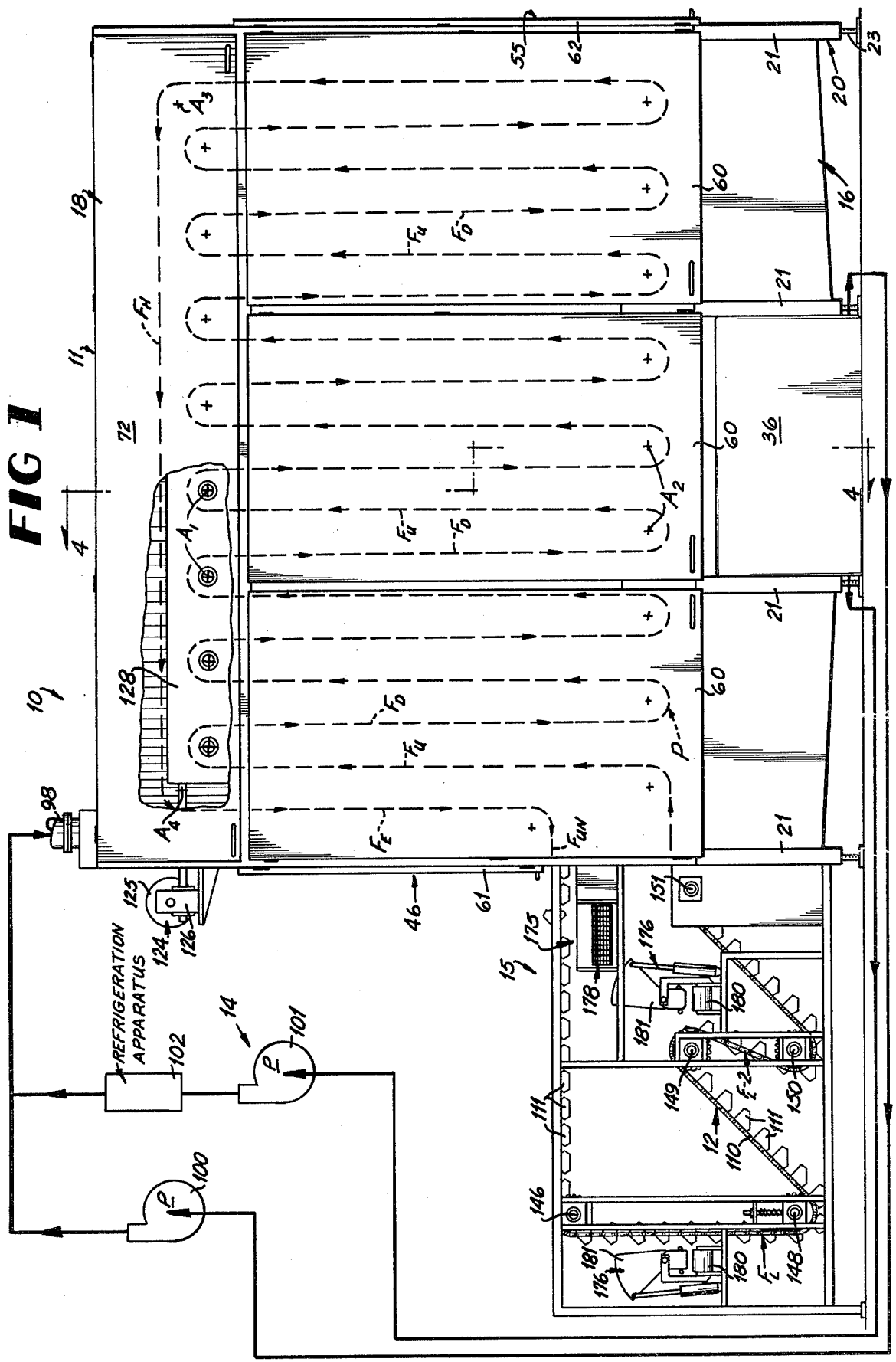
FIG. 1 is a side elevational view illustrating the invention.

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

As seen in the figures, the chiller 10 includes a housing 11 in which is mounted a conveyor 12 for moving the food products through the chiller. A liquid distribution system 14 is provided for circulating a cooled heat transfer liquid over the food products to chill them. A loading and unloading unit 15 is provided to load the food products onto the conveyor 12 for passage through the chiller and then unloading the chilled food products from the conveyor 12 after they have passed through the chiller. The chiller 10 illustrated is designed for chilling packaged food products such as sausage chubs with an elongate cylindrical shape; however, it is to be understood that food products with other shapes may be chilled without departing from the scope of the invention. It is likewise understood that unpackaged food products may be chilled without departing from the scope of the invention. The heat transfer liquid typically used in the chiller 10 is propylene glycol; however, it is to be understood that other heat transfer liquids may be used without departing from the scope of the invention.

Figure 2:
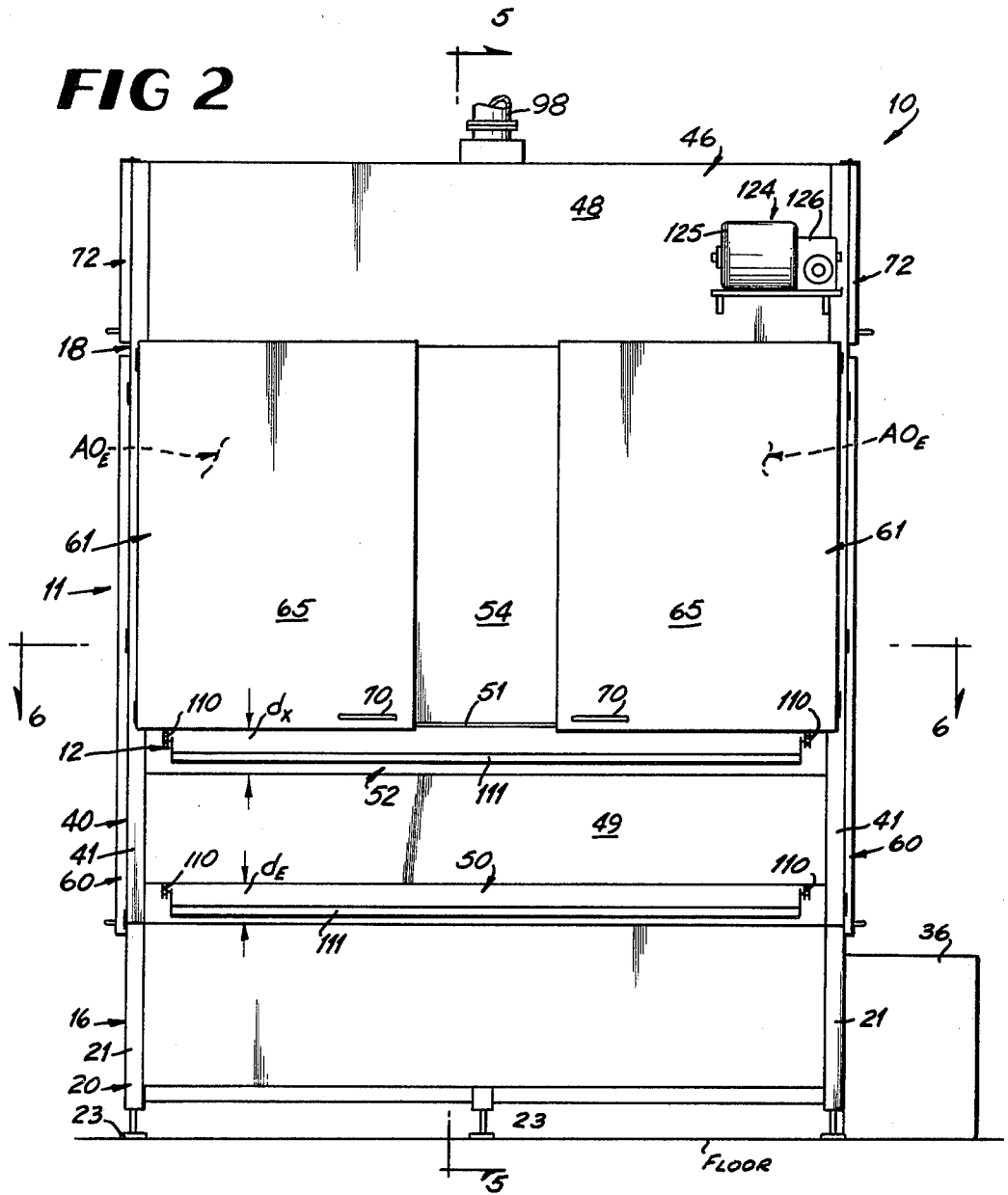
FIG. 2 is an end view with the loading and unload unit omitted.

As best seen in FIGS. 1 and 2, the housing 11 includes a collection section 16 and an enclosure section 18 mounted on top of the collection section 16. The collection section 16 includes a base frame 20 including upstanding support posts 21 equipped with leveling foot pads 23 to support the chiller 10 on the floor of a plant. The posts 21 are joined by upper side members 22 and lower side members 24 best seen in FIGS. 4 and 5 so that the base frame 20 is rectilinear in shape. Cross members 25 extend between the lower side members 24 which are in turn joined by auxiliary support members 26 to form a support grid. Bottom tank plates 28 are mounted on top of the cross members 25 and auxiliary support members 26 while upstanding side tank plates 29 mounted on posts 21 and upper side members around the periphery of the bottom tank plates 28 form an open top collection chamber 30 to collect the heat transfer liquid after it has fallen through the enclosure section 18 as will become more apparent. Insulation 31 is mounted on the outside of the bottom and side tank plates 28 and 29 to insulate the collection chamber 30. The outside of the insulation 31 is covered by cover panels 32 to protect the insulation 31 from damage and keep it in place.

Figure 3:
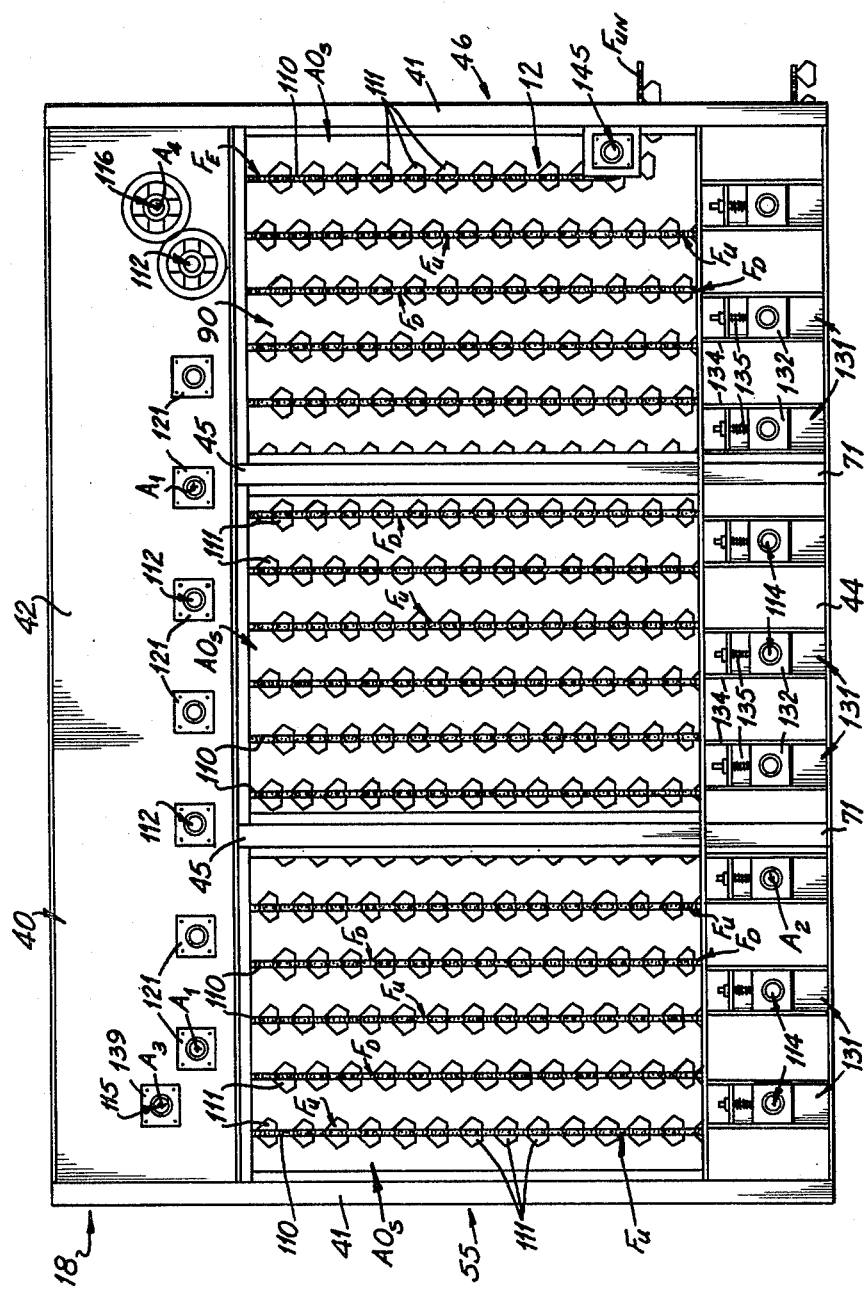
FIG. 3 is a side elevational view of the enclosure section of the invention with the covers omitted.

As best seen in FIG. 1, the bottom of the collection chamber 30 is angled so that the collected heat transfer liquid flows to a sump outlet 34 seen in FIG. 3 provided with an appropriate filter 35. The heat transfer liquid flows into a sump 36 from which it is circulated by the liquid distribution system 14 as will become more apparent.

As best seen in FIGS. 1-5, the enclosure section 18 includes an enclosure frame 40 which conforms to and sits on top of the base frame 20 of the collection section 16. The enclosure frame 40 includes upstanding corner support posts 41 in vertical registration with the support posts 21 on the corners of the collection section 16. Upper side bearing support members 42 connect the upper ends of posts 41 along opposite sides of the frame 40 while lower side bearing support members 44 connect the lower ends of posts 41 along opposite side bearing support members 42. Intermediate side posts 45 connect the upper and lower side bearing support members 42 and 44. It will thus be seen that adjacent posts 41 and 45 together with the side bearing support members 42 and 44 define a plurality of side access openings $AO_s$ therebetween along opposite sides of the enclosure section 18 as best seen in FIG. 3.

Figure 5:
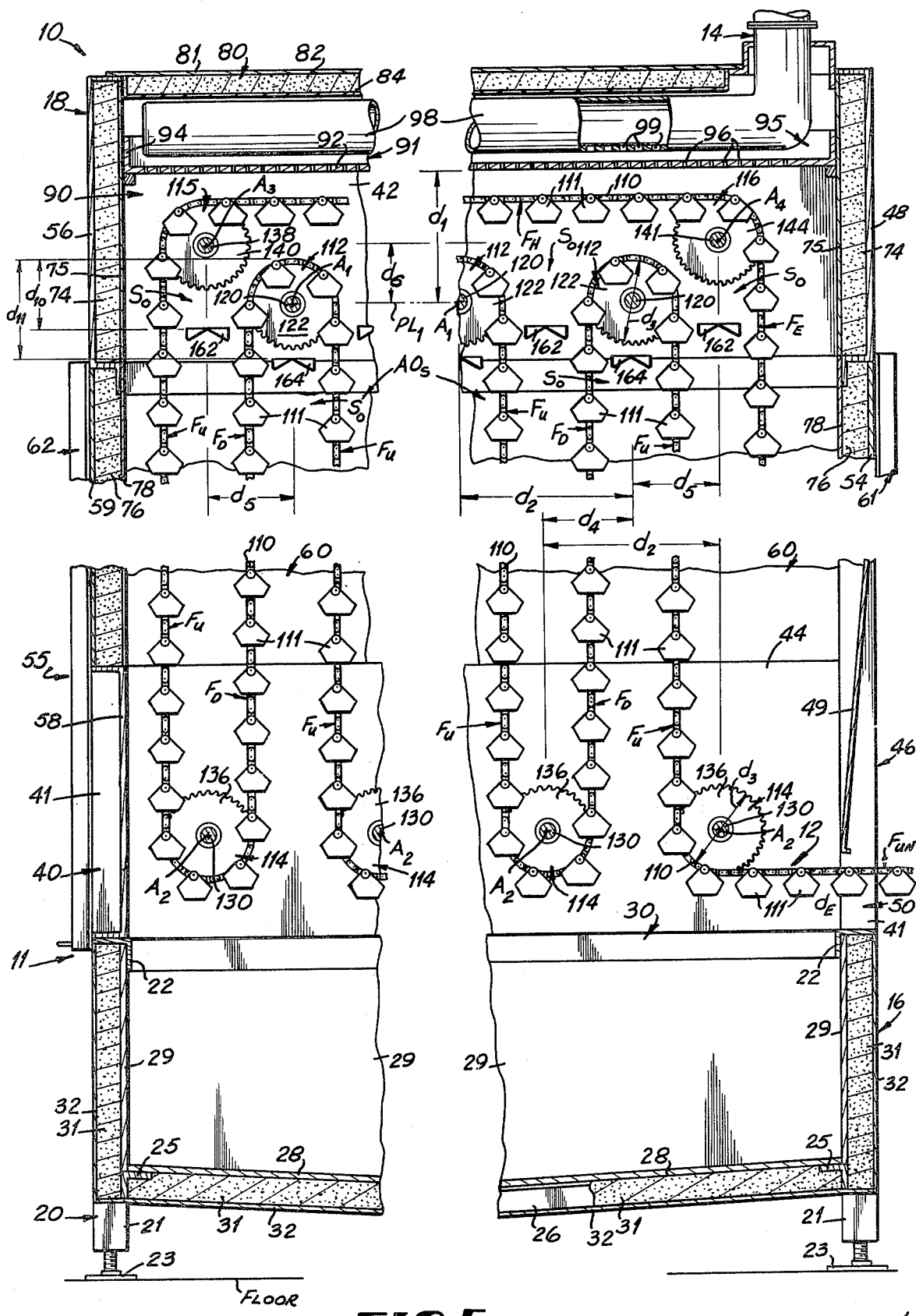
FIG. 5 is an enlarged cross-sectional view taken along line 5—5 in FIG. 2.

As best seen in FIGS. 2 and 5, the corner posts 41 at the near end 46 of the enclosure section 18 are joined by an upper end support member 48 at their upper ends and a lower end support member 49 adjacent their lower ends. The lower end support member 49 is spaced above the lower ends of the support posts 41 a distance $d_E$ to provide an entrance opening 50 between the bottom of member 49 and the top of the collection section 16 into the enclosure section 18 as will become more apparent. An intermediate end support member 51 connects posts 41 and is spaced above the lower end support member 49 the distance $d_x$ to provide an exit opening 52 from the enclosure section 18 as will become more apparent. An upstanding end support 54 connects the upper end support member 48 with the intermediate end support member 51 to form end access openings $AO_E$ (FIG. 6) into the enclosure section 18 bounded by the posts 41, the support 54 and members 48 and 51 as will become more apparent.

Figure 6:
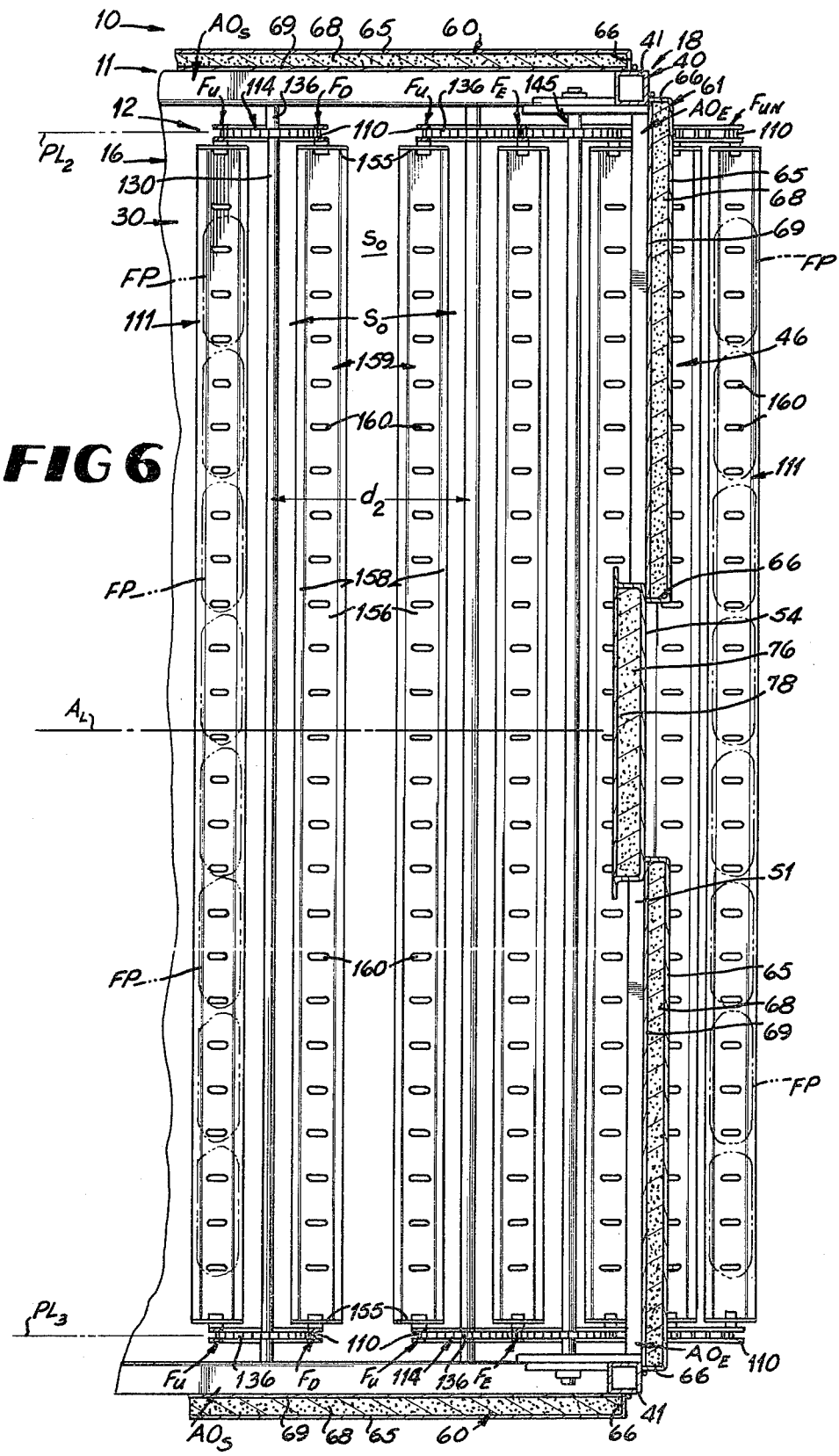
FIG. 6 is an enlarged cross-sectional view taken along line 6—6 of FIG. 2.

As best seen in FIGS. 5 and 6, the corner posts 41 at the distal end 55 of the enclosure section 18 are joined at their upper ends by upper end support member 56 and at their lower ends by lower end support member 58. An upstanding end support 59 connects the support members 56 and 58 to also form end access openings $AO_E$ into enclosure section 18 bounded by posts 41, support 59 and members 56 and 58 as will become more apparent.

The side access openings $AO_s$ are selectively closed by side doors 60 hinged to corner posts 41 or intermediate posts 45 as seen in FIG. 1. The end access openings $AO_E$ on the near end 46 of the enclosure section 18 are selectively closed by near end doors 61 hinged on posts 41 seen in FIG. 2 while the access openings $AO_E$ on the distal end 55 of enclosure section 18 are selectively closed by distal end doors 62 as seen in FIG. 6. Except for size, the doors 60, 61 and 62 have the same construction. Therefore, only the construction of end doors 61 will be described in detail.

Each door 61 as seen in FIG. 6 has an outside panel 65 with edge flanges 66 to form an inwardly opening cavity therein. The cavity is filled with insulation 68 and closed by an inside panel 69 to cover the insulation. An appropriate handle 70 is provided for opening the door 61. Appropriate closure mechanisms (not shown) are also provided for keeping the doors 61 closed so as to seal the access openings $AO_E$. Thus, doors 60, 61 and 62 both seal and insulate the access openings $AO_S$ and $AO_E$.

The height of the side doors 60 is such that the doors also project down over the outside of the lower side bearing support members 44 to cover them. Sealing strips 71 (FIGS. 3 and 4) extend across the members 44 between the doors 60 to provide a seal therebetween. Thus, it will be seen that the side doors 60 insulate the sides of the enclosure section 18 from the upper side bearing support members 42 to the top of the collection section 16.

Figure 4:
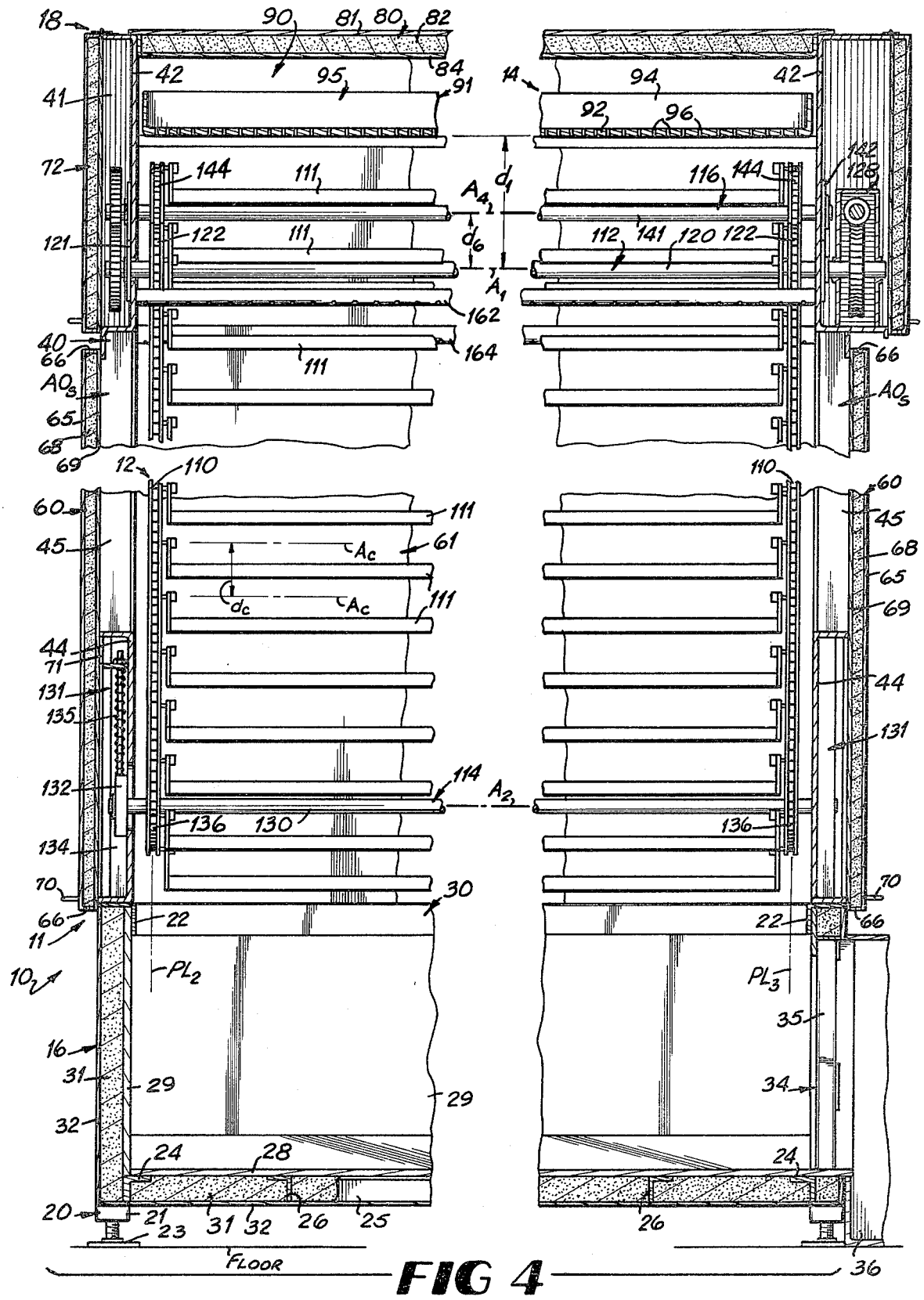
FIG. 4 is an enlarged cross-sectional view taken along line 4—4 in FIG. 1.

The outside of the upper side bearing support members 42 are covered by top side doors 72 seen in FIGS. 1 and 4 hinged along the top of the members 42. The doors 72 have an insulating construction similar to that of doors 61 so as to insulate the sides of the enclosure section 18 above side doors 60.

The upper end support members 48 and 56 define a cavity on the inside thereof filled with insulation 74 as best seen in FIG. 5 to insulate the ends of enclosure section 18 above the doors 61 and 62. Covers 75 enclose the insulation 74 to protect same. It will be noted that the doors 61 on the near end 46 of enclosure section 18 extend down to the top of the exit opening 52 as seen in FIG. 2 while the doors 62 on the distal end 55 of enclosure section 18 extend down over the lower end support member 58 as seen in FIG. 5 to the top of collection section 16. The upstanding end supports 54 and 59 also define cavities on the inside thereof as seen in FIG. 5 filled with insulation 76 and enclosed by covers 78 to insulate the ends of the enclosure section 18 between the doors 61 and 62.

The open top of the enclosure frame 40 is closed by removable top cover panels 80 seen in FIGS. 4 and 5 which sealingly engage the top edges of the upper side bearing support members 42 and upper end support members 48 and 56. Each of the top cover panels 80 includes a support plate 81 engaging the members 42 to support the panels 80 therebetween. The plates 81 on the panels 80 at the end of the enclosure section 18 also engage the end support member 48 or 56. Insulation 82 is attached to the inside of plates 81 and are enclosed by covers 84 to protect the insulation. Thus, it will be seen that the enclosure section 18 defines a cooling chamber 90 therein opening at its bottom into the collection chamber 30 with entrance opening 50 thereto and exit opening 52 therefrom at the near end 46 of enclosure section 18. It will further be seen that this cooling chamber 90 is also insulated to prevent significant cooling losses as will become more apparent.

The conveyor 12 moves the uncooled food products into the cooling chamber 90 through entrance opening 50 and then moves the food products along a serpentine path P through the chamber 90 where they are cooled as will become more apparent. The conveyor 12 then moves the chilled food products back out of the cooling chamber 90 through the exit opening 52 for unloading. The liquid distribution system 14 distributes the cooled heat transfer liquid over the top of the cooling chamber 90 so that it falls by gravity over the food products moved by the conveyor 12 to cool them and then into the collection chamber 30 in the collection section 16.

The liquid distribution system 14 includes a liquid distribution pan 91 horizontally oriented in the top of the cooling chamber 90 as best seen in FIGS. 4 and 5 and mounted between the upper side bearing support members 42. The distribution pan 91 has a perforated bottom wall 92 horizontally oriented and upstanding peripheral walls 94 to form an open top liquid distribution cavity 95 above the bottom wall 92. The apertures 96 in bottom wall 92 are evenly spaced about the wall so that the heat transfer liquid in the distribution cavity 95 will flow from the cavity 95 under the influence of gravity in a multitude of small separate streams from apertures 96 with the streams evenly distributed over the top of the cooling chamber 90. As will become more apparent, the heat transfer liquid level in the cavity 95 is maintained sufficiently deep to insure substantially equal distribution of the heat transfer liquid over the cooling chamber 90.

The heat transfer liquid is supplied to the cavity 95 in distribution pan 91 through a supply header 98 mounted in the top of cooling chamber 90 over the open top of the distribution cavity 95 in pan 91 best seen in FIG. 5. The header 98 extends along the length of pan 91 and distributes the heat transfer liquid in cavity 95 through holes 99 along the bottom of header 98 as best seen in FIG. 5. The header 98 is supplied with heat transfer fluid partly by recirculation pump 100 from sump 36 as schematically illustrated in FIG. 1 and partly by cooling pump 101 from sump 36 through a refrigeration apparatus 102 also schematically illustrated in FIG. 1. The relative amounts of the heat transfer liquid that flows from pumps 100 and 101 will, of course, depend on the rate of heat transferred from the food products to the heat transfer liquid in the cooling chamber 90. Usually, the flow rate from pump 100 is greater than that from pump 101.

The conveyor 12 as seen in FIGS. 2 and 4–6 includes a pair of spaced apart endless chains 110 between which are mounted carriers 111 that support the food products FP as they are moved through the cooling chamber 90. The chains 110 are supported along opposite sides of the cooling chamber 90 and the loading and unloading unit 15 so that each of the chains 110 pass along a serpentine path P in chamber 90 as shown by dashed lines in FIG. 1.

As seen in FIGS. 4 and 5, the chains 110 are supported between upper drive sprocket assemblies 112 mounted between the upper side bearing support members 42 and lower side sprocket assemblies 114 mounted between lower side bearing support members 44 as chains 110 move from the near end of chamber 90 to its distal end. The chains 110 are supported between an upper idler sprocket assembly 115 and a return drive sprocket assembly 116, both mounted between the upper side bearing support members 42, as the chains 110 move from the distal end of chamber 90 to the near end.

Each of the upper drive sprocket assemblies 112 includes a drive shaft 120 with a horizontal shaft axis $A_1$ normal to the longitudinal axis $A_L$ of cooling chamber 90 as best seen in FIG. 6. Opposite ends of shaft 120 extend through the side bearing support members 42 and are rotatably supported by bearings 121 fixedly mounted on the outside of each of the members 42 as best seen in FIGS. 2 and 4. A pair of drive sprockets 122 are fixedly mounted on shaft 120 in chamber 90 so that one of the drive sprockets 122 is just inboard of each upper side bearing support member 42 as seen in FIG. 4.

As best seen in FIGS. 2 and 5, the drive shafts 120 in the assemblies 112 are oriented so that their axes $A_1$ lie in a common horizontal plane $PL_1$ positioned below the liquid distribution pan 91 the distance $d_1$ seen in FIG. 5 and with the axes $A_1$ spaced from each other along the plane $PL_1$ the distance $d_2$ as will become more apparent. The working diameter $d_3$ of sprockets 122 is one-half the distance $d_2$ as will also become more apparent. As seen in FIG. 4, the drive sprockets 122 in the assemblies 112 lie in a pair of spaced apart vertical planes $PL_2$ and $PL_3$.

As seen in FIGS. 1 and 4, one end of each of the drive shafts 120 extends through bearing 121 and is connected to a conveyor drive 124. The drive 124 has a drive motor 125 seen in FIGS. 1 and 2 with a gearbox 126 that drives a common transmission 128. The shafts 120 are all drivingly connected to the transmission 128 so that motor 125 synchronously rotates all of the drive shafts 120 and thus sprockets 122.

The lower idler sprocket assemblies 114 each include an idler shaft 130 with a generally horizontal shaft axis $A_2$ seen in FIG. 4 normal to the longitudinal axis $A_L$ of chamber 90. Opposite ends of the shaft 130 extend through appropriate apertures in the lower side bearing support members 44 and are rotatably supported in self-adjusting tensioning bearing assemblies 131 mounted on the outside of the members 44. The bearing assemblies 131 are conventional in construction and are used to keep the chains 110 taut as will become more apparent. The bearing assemblies 131 slidably mount bearing blocks 132 in a guide 134 so that the bearing blocks 132 are vertically movable and a tensioning spring assembly 135 appropriately urges the bearing blocks 132 to maintain tension in the chains 110 as will become more apparent. The movable bearing blocks 132 rotatably mount shaft 130. The idler shaft 130 fixedly mounts a pair of idler sprockets 136 thereon in chamber 90 so that one of the sprockets 136 is just inboard of each of the lower side bearing support members 44 so that the sprockets 136 also lie in the vertical planes $PL_2$ and $PL_3$ as seen in FIG. 4.

The idler shafts 130 are horizontally spaced from each other the distance $d_2$ as seen in FIG. 5 while the idler sprockets 136 have the same working diameter $d_3$ as the drive sprockets 122. It will also be seen in FIG. 5 that the axis $A_2$ of each of the idler shafts 130 is horizontally shifted the distance $d_4$ equal to one-half the distance $d_2$ with respect to its corresponding drive shaft 120 so that the idler shafts 130 are vertically centered between the drive shafts 120.

The bottoms of the sprockets 136 on that lower idler sprocket assembly 114 adjacent the near end of the cooling chamber 90 are aligned with the entrance opening 50 into the cooling chamber 90 so that the conveyor chains 110 pass into chamber 90 through opening 50 and then under these sprockets 136 as seen in FIG. 5. The chains 110 then alternately pass vertically upwardly over the drive sprockets 122 in drive sprocket assemblies 112 and vertically downwardly under the idler sprockets 136 in idler sprocket assemblies 114 along the length of the cooling chamber 90 in alternating vertically downwardly extending flights $F_U$ and vertically downwardly extending flights $F_D$ parallel with flights $F_U$. The spring assemblies 135 in the self-adjusting tension bearing assemblies 131 serve to urge the bearing blocks 132 and thus idler sprockets 136 downwardly to keep the flights $F_U$ and $F_D$ taut between the drive sprockets 122.

The upper idler sprocket assembly 115 includes an idler shaft 138 with a horizontal shaft axis $A_3$ seen in FIG. 5 normal to longitudinal axis $A_L$ of cooling chamber 90. The idler shaft 138 is rotatably journalled between bearings 139 seen in FIG. 3 fixedly mounted on the outside of upper side bearing support members 42 adjacent the distal end thereof. Shaft 138 mounts a pair of idler sprockets 140 thereon in chamber 90 inboard of members 42 as seen in FIG. 5 so that sprockets 140 lie in planes $PL_2$ and $PL_3$. The axis $A_3$ of shaft 138 is located the distance $d_4$ toward the distal end of the enclosure section 18 from the axis $A_1$ of the shaft 120 in the upper drive sprocket assembly 112 closest to the distal end 55 so that the chains 110 passing upwardly from the idler sprockets 136 on the lower idler sprocket assembly 114 closest to the distal end 55 of the enclosure section 18 and over the sprockets 140 form a vertical upwardly extending flight $F_U$. The axis $A_3$ of shaft 138 is also located a distance $d_5$ above the horizontal plane $PL_1$ of axes $A_1$ of shafts 120 so that the chains 110 passing over the sprockets 140 and extending back toward the near end 46 of enclosure section 18 are spaced above the sprockets 122 on assemblies 112 and under the distribution pan 91 as will become more apparent.

The return drive sprocket assembly 116 includes a return drive shaft 141 with a horizontal shaft axis $A_4$ seen in FIGS. 4 and 5 normal to the longitudinal axis $A_L$ of chamber 90. The drive shaft 141 is rotatably journalled between bearings 142 seen in FIG. 4 on the outside of the side bearing support members 42 adjacent the near end thereof. Shaft 141 fixedly mounts a pair of return drive sprockets 144 thereon (FIGS. 4 and 5) in chamber 90 inboard of side members 42 so that sprockets 144 lie in the planes $PL_2$ and $PL_3$. The axis $A_4$ of shaft 141 is spaced above the horizontal plane $PL_1$ the distance $d_5$ like shaft 138 on assembly 115 so that the chains 110 passing over sprockets 140 and 144 form a horizontal return flight $F_H$ therebetween spaced above the drive sprockets 122 in the upper drive sprocket assemblies 112 and passing under the distribution pan 91. The axis $A_4$ is also horizontally spaced the distance $d_6$ toward the near end of enclosure section 18 from the axis $A_1$ of the upper drive sprocket assembly 112 closest to the near end 46 of enclosure section 18 so that the chains 110 can pass over sprockets 144 and then downwardly toward the exit opening 52 without interference with the closest flight $F_U$ of chains 110.

A pair of exit sprockets 145 seen in FIG. 6 are rotatably mounted in chamber 90 at the exit opening 52 so that the chains 110 pass vertically down from the return drive sprockets 144 in a vertical exit flight $F_E$ under the exit sprockets 145 and then out through the exit opening 52 to the loading and unloading unit 15. The sprockets 90 are likewise located in the vertical planes $PL_2$ and $PL_3$.

The chains 110 pass out of the exit opening 52 and move along a generally horizontal unloading flight $F_{UN}$ seen in FIGS. 1 and 5 in the loading and unloading unit 15 where the cooled food products are unloaded from the conveyor 12 as will be explained. As seen in FIG. 1, the chains 110 then pass over upper unload guide sprocket assembly 146 and vertically downwardly along loading flight $F_L$ where uncooled food products are reloaded into conveyor 12. The chains 110 then pass under first lower load guide sprocket assembly 148 and, where multiple loading stations are provided as illustrated, then angularly upward over upper load guide sprocket assembly 149. The chains 110 then pass downwardly along a second loading flight $F_L$-2 where uncooled food products are also reloaded into conveyor 12 and under second lower load guide sprocket assembly 150. The chains then pass angularly upwardly over entry guide sprocket 151 and finally back under the lower idler sprockets 136 in the idler sprocket assembly 114 closest to the near end 46 of the enclosure section 18.

The product carriers 111 are pivotally attached between the chains 110 so that the carriers 111 move with the chains 110 through the chiller. Each of the carriers 111 is attached to the chains 110 so that the carrier is pivoted about a carrier axis $A_C$ which remains both horizontal and normal to the longitudinal axis $A_L$ as it moves through the chiller. The carriers 111 are attached to the chains 110 so that the axes $A_C$ of adjacent carriers are located from each other a distance $d_c$ as best seen in FIG. 5.

Each carrier 111 as seen in FIGS. 4, 5, 7 and 8 has a pair of upstanding end plates 155 at opposite ends thereof joined by a bottom wall 156 extending along the length of the carrier. A pair of side walls 158 extend along and are integral opposite sides of the bottom wall 156. The side walls 158 join with the end plates 155 at opposite ends thereof and angle away from the bottom wall at an obtuse angle $A_5$ as best seen in FIG. 7. The plates 155 and walls 156 and 158 thus define an open top product receiving cavity 159 therein. The end plates 155 are pinned to chains 110 at a point opposite the bottom wall 156 and centered across the width thereof so that the weight of the carrier 111 tries to keep the bottom wall 156 generally horizontal at all times in a direction transversely of the pivot axis $A_C$ with the cavity 159 below the carrier pivot axis $A_C$. Thus, the food products FP placed in the cavity 159 will remain therein as the carriers 111 move through the chiller. When cylindrical shaped food products such as sausage chubs are to be carried in the carriers 111, the bottom wall 156 may be slightly concave to center the food product, but not sufficiently concave to cause excessive freezing of the food product onto the bottom wall to cause it to stick.

The open top of the cavity 15 in carrier 111 has a transverse width $W_C$ at the upper edges of the side walls 158 as best seen in FIGS. 7 and 8. This width $W_C$ is less than the center-to-center distance $d_c$ between the carriers 111 so that the carriers 111 are free to pivot about axes $A_C$. It will also be seen that the carrier 111 has a transverse width $W_B$ at the bottom wall 156 less than width $W_C$ as will become more apparent.

To allow the heat transfer liquid caught in cavity 159 to drain therefrom, a plurality of drain openings 160 are provided through the bottom wall 156 of carrier 111. The drain openings 160 are equally spaced along the length of the bottom wall 156 and each is centered transversely of bottom wall 156. Each of the openings 160 has a length $L_O$ in a direction transversely of carrier 111 less than the bottom width $W_B$ of carrier 111 but sufficient to freely permit the heat transfer liquid to pass around the food products FP and out the openings 160 to fall by gravity below the carrier 111. When the carriers 111 are passing vertically along one of the flights $F_U$ or $F_D$, it will be seen that the carriers 111 in that flight will be vertically aligned. Because the open top of the cavity 159 is wider than the length of the openings 160 in a direction transverse of the carrier 111, the streams of heat transfer fluid flowing out of openings 160 will also be narrower than the open top of the cavity 159 in the carrier 111 below the carrier 11 from which the streams are flowing. This causes the heat transfer liquid to drain from carrier to carrier in the flight $F_U$ or $F_D$ thereby sequentially contacting the food products FP in each carrier along the flight. This serves to maximize the number of times the heat transfer liquid contacts the food products. Any heat transfer liquid flowing down the outside of the side walls 158 of the carriers 111 will also flow into the cavity 159 in the carrier 111 therebelow since the side walls 158 angle inward to the width $W_B$ less than the width $W_C$ of the open top of the next lower cavity 159.

As already mentioned, the heat transfer liquid is evenly distributed over the top of cooling chamber 90 in small streams from the perforated bottom wall 92 in the distribution pan 91. As these streams fall by gravity toward the bottom of the cooling chamber 90, they fall onto the food products carried by the carriers 111 moving along the horizontal return flight $F_H$ to cool the food products in this flight. The heat transfer liquid is caught by the carriers 111 in flight $F_H$ and then falls out the bottom openings 160 after contacting the food products. Because the carriers 111 are generally equally spaced along flight $F_H$, the streams of heat transfer liquid from openings 160 are also generally evenly distributed over the cooling chamber 90. It will also be seen that part of the heat transfer liquid falling from the distribution pan 91 will fall between the carriers 111 and continues to fall toward the bottom of the cooling chamber 90. Thus, after passing the horizontal return flight $F_H$ of conveyor 12 moving through the upper portion of the cooling chamber 90, the heat transfer liquid falls toward the bottom of chamber 90 in the small streams passing between the carriers 111 and in larger streams from the discharge openings 160 in carriers 111.

These streams of heat transfer liquid falling below the upper horizontal flight $F_H$ start contacting the food products in the carriers 111 at the upper ends of the vertical flights $F_U$ and $F_D$ as well as the carriers 111 moving between flights $F_U$ and $F_D$ around the sprockets 122 in the upper drive sprocket assemblies 112 to cool the food products in these carriers. The heat transfer liquid caught by the carriers 111 at the upper ends of the flights $F_U$ and $F_D$ falls out of the discharge openings 160 onto the food products in the carrier 111 immediately therebelow. Therefore, once caught in a carrier 111 at the upper ends of the flights $F_U$ and $F_D$, the heat transfer liquid remains in alignment with the carriers 111 in that flight and falls from carrier to carrier as it moves down the flight and contacts the food products in each carrier to cool same.

The flights $F_U$ and $F_D$ are horizontally spaced apart so as to define a space $S_O$ between the carriers 111 in adjacent flights $F_U$ and $F_D$ as best seen in FIGS. 7 and 8 of a width $W_S$ in a direction longitudinally of the cooling chamber 90 as seen in FIG. 7. Thus, while part of the heat transfer liquid is caught in carriers 111 at the upper ends of flights $F_U$ and $F_D$, the rest of the heat transfer liquid continues to fall downwardly in the spaces $S_O$ between flights $F_U$ and $F_D$ without coming into cooling contact with the food products in flights $F_U$ and $F_D$.

To divert the falling heat transfer liquid out of the spaces $S_O$ into alignment with the carriers 111 moving along flights $F_U$ and $F_D$ adjacent each space $S_O$, a deflection means 161 is provided best seen in FIGS. 5, 7 and 8. The deflection means 161 includes a plurality of upper deflection pans 162 and a plurality of lower deflection pans 164. One of the deflection pans 162 is positioned in each space $S_O$ between adjacent flights $F_U$ and $F_D$ to the drive sprockets 122 on adjacent upper drive sprocket assemblies 112 while one of the deflection pans 164 is located in the space $S_O$ between flights $F_U$ and $F_D$ to the same drive sprocket 122 on upper drive sprocket assembly 112 as seen in FIG. 5. The deflection pans 162 and 164 are horizontally oriented across the cooling chamber 90 so that the pans 162 and 164 are also normal to the longitudinal axis $A_L$ of chamber 90. Opposite ends of the deflection pans 162 and 164 are supported on the upper side bearing support members 42 in enclosure frame 40.

The upper deflection pans 162 are located adjacent the upper ends of the spaces $S_O$ between adjacent drive sprockets 122 in assemblies 112 at a distance $d_{10}$ below the uppermost portions of the chains 110 passing over sprockets 122. The distance $d_{10}$ is selected so that the pans 162 are at about the level of the uppermost carriers 111 in the flights $F_U$ and $F_D$. The lower deflection pans 164 are located adjacent the upper ends of the spaces $S_O$ under the drive sprockets 122 of each assembly 112 at a distance $d_{11}$ below the uppermost portions of the chains 110 passing over sprockets 122. The distance $d_{11}$ is selected so that deflection pans 164 are located immediately under the drive sprockets 122 with drive sprockets 122 having running clearance over pans 164.

The pans 162 and 164 have the same construction. Therefore, only pan 162 will be described in detail with like references being applied to pans 164. As best seen in FIGS. 7 and 8, the pan 162 has a transverse width $W_P$ in a direction longitudinally of the cooling chamber 90 slightly less than the width $W_S$ of space $S_O$ and is centered in the space $S_O$ so that running clearance is provided between the pan 162 and the carriers 111 in the flights $F_U$ and $F_D$. The pan 162 has a bottom wall 165 extending along the length thereof with an inverted V-shaped cross-section as best seen in FIG. 7. The bottom wall 165 is provided with upstanding side flanges 166 integral with opposite edges of the bottom wall 165 and extending along the length thereof. Upstanding end flanges 168 are provided at opposite ends of bottom wall 165 and join with the side flanges 166 to form an open top liquid collection cavity 169 in pan 162. Because of the inverted V-shaped cross-section of bottom wall 165, the cavity 169 is deeper adjacent the side flanges 166 than in the middle. The juncture between the bottom wall 165 and each of the side flanges 166 is provided with a plurality of dispersion apertures 170 therethrough so that the heat transfer liquid caught in cavity 169 will be discharged through apertures 170. The apertures 170 are angled at an included angle $A_A$ with respect to the vertical so the heat transfer liquid flowing therethrough will be directed into vertical alignment with the carriers 111 in flights $F_U$ and $F_D$. The apertures 170 are sized so that a sufficient pressure head is maintained in the liquid in cavity 169 to insure that the streams of heat transfer liquid flowing out of the apertures 170 will be deflected out of the space $S_O$ into alignment with the carriers 111 in flights $F_U$ and $F_D$ as illustrated in FIG. 7. The apertures 170 are equally spaced along the length of pan 162 so that the streams of heat transfer liquid discharged therefrom are evenly distributed across the width of the cooling chamber 90.

The pans 162 and 164 serve to catch the heat transfer liquid falling into spaces $S_O$ adjacent the upper end of the spaces $S_O$. The pans 162 and 164 then deflect this caught heat transfer liquid out of spaces $S_O$ into alignment with the carriers 111 in the flights $F_U$ and $F_D$. Once so deflected, the heat transfer liquid falls from carrier to carrier while staying substantially in vertical alignment with the carriers 111 moving along flights $F_U$ and $F_D$ as schematically illustrated in FIG. 5. The heat transfer liquid thus falls from the distribution pan 91 in small streams evenly distributed over the top of the cooling chamber 90 to contact and cool the food products moving along the horizontal return flight $F_H$ of conveyor 12 and then divides the downwardly falling heat transfer liquid into separate stream bands in vertical registration with the carriers 111 in flights $F_U$ and $F_D$ so that substantially all of the food products moving along flights $F_U$ and $F_D$ are contacted by the heat transfer liquid to maximize the amount of heat transferred from the food products to the heat transfer liquid. After the heat transfer liquid has fallen from carrier to carrier in flights $F_U$ and $F_D$, it falls into the collection chamber 30 for recirculation. It will also be appreciated that the flow of the heat transfer liquid under the force of gravity over the food products is sufficiently fast to maintain rapid heat transfer rates between the food products and the heat transfer liquid. As a result, the number of flights $F_U$ and $F_D$ may be minimized to achieve the desired level of chilling of the food products. Further, by using vertical flights $F_U$ and $F_D$, maximum utilization of the volume of the cooling chamber 90 is achieved. This allows the size of the chiller 10 to be minimized. The height of the flights $F_D$ and $F_U$ is maximized to the available ceiling height available in the processing plant thereby minimizing the amount of floor space required for the chiller. Also, because the amount of heat transferred to the heat transfer liquid from the food products each time the heat transfer liquid falls downwardly through cooling chamber 90 is maximized, the amount of recirculation of the heat transfer liquid from the collection chamber 30 to the distribution pan 91 is minimized. These features thereby minimize both the initial capital costs and the operating costs of the chiller.

As best seen in FIG. 1, the loading and unloading unit 15 is conventional. The unit 15 is provided with an unloading mechanism 175 and one or more loading mechanisms 176. Two loading mechanisms 176 are illustrated.

Figure 9:
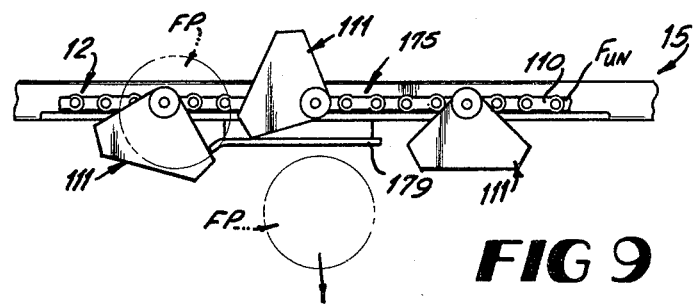
FIG. 9 is an enlarged fragmentary view illustrating the unloading of the food products from the invention.

The unloading mechanism 175 includes a discharge conveyor 178 positioned below the horizontal unloading flight $F_{UN}$. Pivot cams 179 seen in FIG. 9 are mounted on the unit 15 adjacent the flight $F_{UN}$ of chains 110 above the discharge conveyor 178 so that the cams 179 engage the carriers 111 as they are moved thereby to pivot each of the carriers 111 sufficiently to cause the chilled food products to fall out of the carrier 111 onto the discharge conveyor 178 as is well known in the art.

Each loading mechanism 176 as best seen in FIG. 1 includes an infeed conveyor 180 which transports the uncooled food products from the processing machinery into the unit 15. A transfer mechanism 181 is provided adjacent the loading flight $F_L$ or $F_L$-2 of the conveyor 12 which accumulates the food products on conveyor 180 until the desired number of food products has been accumulated to load a carrier 111 and then sweeps the accumulated food products from the conveyor 180 into the product cavity 159 in carrier 111 as it passes the conveyor 180. The loading operation is appropriately timed so that the products will fall into the carriers 111.

Where multiple loading mechanisms 176 are provided as seen in FIG. 1, the loading operation of each is timed so that one of the mechanisms 176 load some of the carriers 111 while the other mechanism 176 loads the rest of the carriers 111 as is well understood in the art.

What is claimed as invention is:

1. A chiller for edible food products using a heat transfer liquid comprising:

an enclosure having upper and lower portions;

endless conveyor means for conveying the edible food products along a serpentine path through said enclosure, said conveyor means defining a plurality of spaced apart, substantially vertically extending flights within said enclosure, said flights generally parallel to each other and alternating between substantially vertical upward movement and substantially vertical downward movement so that the edible food products are alternately moved substantially vertically upwardly and downwardly along the serpentine path within said enclosure; and liquid control means for supplying the heat transfer liquid to the upper portion of said enclosure so that the heat transfer liquid is moved toward the lower portion of said enclosure under the influence of gravity and for directing the flow of the heat transfer liquid flowing down through said enclosure in flow paths in registration with the food products moving along said substantially vertical flights by said endless conveyor means so that substantially all of the heat transfer fluid flows down over the edible food products moving along said substantially vertical flights.

2. The chiller of claim 1 further including insulating means for insulating said enclosure.

3. The chiller of claim 1 wherein said endless conveyor means further defines a substantially horizontally extending flight within said enclosure positioned above said substantially vertically extending flights so that the edible food products are moved horizontally therealong and wherein said liquid control means further includes:

liquid distribution means in said enclosure above said substantially horizontally extending flight for evenly distributing the heat transfer liquid over the upper portion of said enclosure so that the heat transfer liquid falls downwardly in said enclosure into contact with the edible food products moving along said substantially horizontally extending flight; and liquid deflection means in said enclosure below said substantially horizontally extending flight for deflecting the heat transfer liquid falling between said substantially vertically extending flights of said conveyor means into registration with said substantially vertically extending flights to maintain substantially all of the heat transfer liquid flowing over the edible food products moving along said substantially vertical flights.

4. The chiller of claim 3 wherein said endless conveyor means includes a plurality of product carriers successively moving along said serpentine path so that a plurality of said carriers lie along each of said vertically extending flights in vertical alignment with each other at any given time, each of said carriers defining an upwardly opening product carrying cavity therein in which the food products are supported and defining a plurality of discharge openings from said product carrying cavity so that heat transfer fluid caught in said product carrying cavity in each of said carriers moving along one of said substantially vertically extending flights will drain from said product carrying cavity into said product carrying cavity of the next adjacent of said carriers below the first mentioned of said carriers in said one of said vertically extending flights and contacts the food products in the next adjacent of said carriers whereby the heat transfer liquid falls sequentially through said carriers in said one of said vertically extending flights while sequentially contacting the food products in each of said carriers in said flight.

5. The chiller of claim 4 wherein said endless conveyor means includes a pair of spaced apart endless chains arranged in said vertically extending flights and said horizontal flight within said enclosure and drive means for moving said chains along said flights, said product carriers pivotally mounted between said endless chains about pivot axes maintained horizontally oriented as said chains move through said enclosure and said product carriers constructed and arranged so that the weight of said carriers keeps said product receiving cavity in each of said carriers substantially centered below said pivot axis of said carrier to keep the food products within said product receiving cavity as said carrier is moved through said enclosure.

6. The chiller of claim 5 wherein said conveyor includes a plurality of upper sprocket assemblies mounted in the upper portion of said enclosure and longitudinally spaced along the length of said enclosure and a plurality of lower sprocket assemblies mounted in the lower portion of said enclosure and longitudinally spaced along the length of said enclosure, each of said sprocket assemblies including a pair of spaced apart sprockets interconnected so that said pair of sprockets rotate together about substantially horizontal axes extending across said enclosure, one of said endless chains supported between one of each of said pair of sprockets on said plurality of upper sprocket assemblies and said plurality of lower sprocket assemblies and the other of said endless chains supported between the other of each of said pair of sprockets on said plurality of upper sprocket assemblies and said plurality of lower sprocket assemblies to form said substantially vertically extending flights between said upper and lower sprocket assemblies; and wherein said liquid deflection means includes:

a first plurality of deflector pans, one of said first plurality of deflector pans positioned between the upper ends of each pair of said substantially vertically extending flights adjacent each other whose upper ends are supported on said sprockets of said upper sprocket assemblies adjacent each other; and a second plurality of deflector pans, one of said second plurality of deflector pans positioned below said sprockets of each of said upper sprocket assemblies and between each pair of said substantially vertically extending flights adjacent each other whose upper ends are supported on said sprockets of each of said upper sprocket assemblies, each of said deflector pans extending across said enclosure between said adjacent flights and sized so that said carriers moving along said adjacent flights move freely thereby without interference therewith, each of said deflector pans constructed and arranged to divert heat transfer liquid falling between said adjacent flights into said product carrying cavities of said carriers moving along at least one of said adjacent flights past said deflector pan.

7. The chiller of claim 4 wherein said liquid deflection means includes a plurality of deflector pans, one of said deflector pans positioned between the upper ends of each pair of said substantially vertically extending flights adjacent to each other, each of said deflector pans extending across said enclosure between said adjacent flights and sized so that said carriers moving along said adjacent flights move freely thereby without interference therewith, each of said deflector pans constructed and arranged to divert heat transfer liquid falling between said adjacent flights into said product carrying cavities of said carriers moving along at least one of said adjacent flights past said deflector pan.

8. The chiller of claim 7 wherein each of said deflector pans defines an upwardly opening liquid cavity therein in which the heat transfer liquid falling between said adjacent flights is caught and a plurality of dispensing apertures from said liquid cavity for discharging the heat transfer fluid from said liquid cavity into said product carrying cavities of said carriers moving along both of said adjacent flights past said deflector pan.

9. The chiller of claim 8 wherein said dispensing apertures in each of said deflector pans are sized and oriented to maintain a pressure head in the heat transfer liquid caught in said liquid cavity to force the heat transfer liquid through said dispensing apertures at a rate such that the heat transfer liquid issuing from said dispensing apertures is directed out from between said substantially vertically extending flights into registration with said product carrying cavities in said carriers moving along said adjacent flights.

10. A chiller for edible food products using a heat transfer liquid comprising:
   a housing defining a cooling chamber therein enclosed;
   a housing including a collection section defining an open top collection chamber therein and an enclosure section mounted on top of said collection section defining an open bottom cooling chamber therein above and in communication with said collection chamber; said collection section including opposed tank side wall sections, opposed tank end wall sections joining said side wall sections, and a tank bottom wall section joining the bottom of said side and end wall sections to form said collection chamber, each of said tank side, end and bottom wall sections including spaced apart tank cover members and tank insulation between said tank cover members to insulate said collection chamber; said enclosure section including opposed enclosure side wall sections positioned on said tank side wall sections, opposed enclosure end wall sections joining said enclosure side wall sections and positioned on said tank end wall sections, and an enclosure top wall section joining the top of said enclosure side and end wall sections to form said cooling chamber, each of said enclosure side, end and top wall sections including spaced apart enclosure cover members and enclosure insulation between said enclosure cover members to insulate said cooling chamber; said enclosure side wall sections further defining access openings therethrough to said cooling chamber and including access cover doors for selectively closing said access openings; each of said access cover doors including spaced apart door cover members and door insulation between said door cover members so that said access cover doors insulate said cooling chamber at said access openings when said access cover doors close said access openings;
   endless conveyor means for moving the edible food products through said cooling chamber along a serpentine path; and
   liquid distribution means for supplying the heat transfer fluid to the top of said cooling chamber so that the heat transfer fluid falls toward said collection chamber under the force of gravity while contacting the food products moving through said cooling chamber to cool same.

* * * * *